(No Model.)
G. A. FAIRFIELD.
Fly Wheel and Bearing for Sewing Machine Stands.
No. 240,898. Patented May 3, 1881.
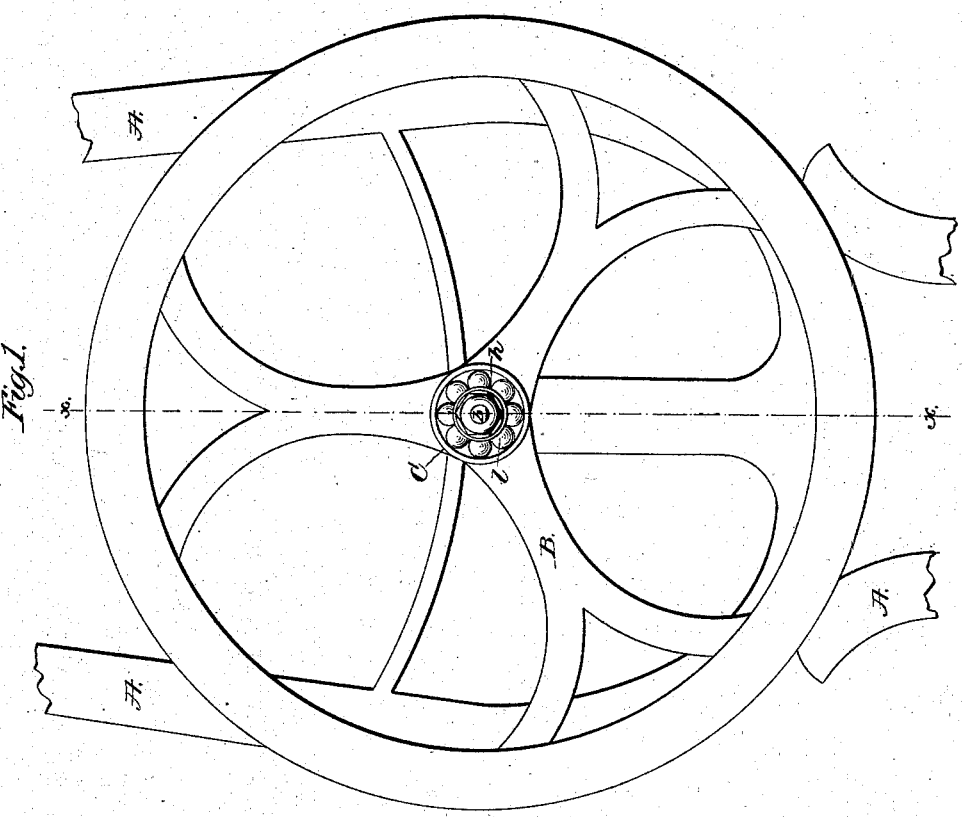
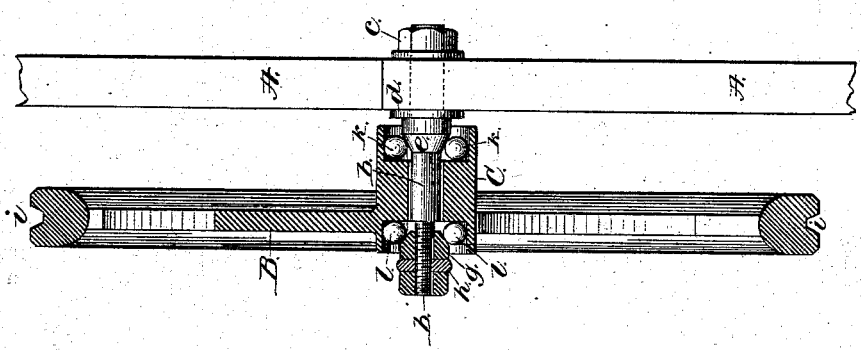
Witnesses.
Arthur Reynolds
Pierce J. Noyes.
Inventor:
George A. Fairfield,
by Crosby & Gregory Attys.

UNITED STATES PATENT OFFICE.

GEORGE A. FAIRFIELD, OF HARTFORD, CONNECTICUT, ASSIGNOR TO THE WEED SEWING MACHINE COMPANY, OF SAME PLACE.

FLY-WHEEL AND BEARING FOR SEWING-MACHINE STANDS.

SPECIFICATION forming part of Letters Patent No. 240,898, dated May 3, 1881.

Application filed March 21, 1881. (No model.)

*To all whom it may concern:*

Be it known that I, GEO. A. FAIRFIELD, of Hartford, county of Hartford, State of Connecticut, have invented a new and useful Improvement in Fly-Wheels and Bearings for Sewing-Machine Stands, of which the following description, in connection with the accompanying drawings, is a specification.

This invention relates to an improved bearing for fly-wheels and parts of sewing-machines, the object of the invention being to lessen friction and make the parts more durable.

My invention consists in a chambered bearing and two sets of friction-balls placed in the said chambers, combined with a stud having a conical collar and an adjustable conical washer, the said collar and washer co-operating with the friction-balls to take up wear and lost motion, while the balls sustain the bearing or hub, substantially as hereinafter described.

Figure 1 represents, in elevation, a sufficient portion of a sewing-machine stand and fly-wheel attached thereto to illustrate one embodiment of my invention; and Fig. 2 is a section of Fig. 1 on the line $x$ $x$.

Referring to the drawings, A represents one of the side frames of a sewing-machine stand, it being of any usual shape. The stud $b$, adjustably connected with the said stand by the nut $c$, and having a collar, $d$, to bear against the outer face of the stand A, is also provided with a conical collar, $e$, and is screw-threaded at its outer end to receive the conical washer $g$ and adjusting-nut $h$.

The fly-wheel B is grooved at $i$ to receive the usual driving-belt.

Each end of the bearing or hub C is chambered, as shown in Fig. 2, to receive the series of friction-balls $k$ $l$, one series in each chamber. When the hub is placed upon the stud $b$, as in Fig. 2, the series of friction-balls $k$ bear against and run upon the conical collar $e$, and while the conical washer $g$, placed upon the stud $b$, outside the bearing or hub, is adjustably held by the set-nut $h$ against and so as to support the series of friction-balls $l$, holding them in place in the outer chamber of the said hub, the conical collar $e$ retains the series of friction-balls $k$ in the chamber at the inner end of the said hub. The interior of the hub of the wheel B does not touch the stud $b$, and all the friction to be overcome by the hub C in its rotation is that produced between the interior of the hub, the friction-balls, and conical surfaces of the collar and washer. The wheel B, supported in this manner, may be revolved with the minimum of friction, thus enabling the sewing-machine to be run easily and rapidly with but small exertion of power and without necessity of lubricants.

I do not broadly claim friction-balls in bearings and for use in connection with shafting, as I am aware that such are not new.

The wear of the balls or lost motion is readily compensated for by adjusting the nut $h$ and forcing the conical washer farther on the stud and toward the conical collar. The same advantages would be gained if the stud $b$ were a rotating shaft and the bearing or hub C were fixed.

I claim—

The stud or shaft $b$, having the conical collar $e$, combined with a wheel having a hub chambered at each end, the friction-balls $k$ $l$, arranged in such chambered hub, and the adjustable conical washer $g$, to secure the balls and wheel in place and take up wear, substantially as shown and described.

In testimony whereof I have signed my name to this specification in the presence of two subscribing witnesses.

GEO. A. FAIRFIELD.

Witnesses:
GEO. H. DAY,
J. L. BLANCHARD.